(12) United States Patent
Tahk et al.

(10) Patent No.: US 7,369,287 B2
(45) Date of Patent: May 6, 2008

(54) MIRROR POSITIONING STRUCTURE FOR COMPENSATION OF SKEW AND BOW AND LASER SCANNING UNIT EMPLOYING THE SAME

(75) Inventors: Gyung-mo Tahk, Seoul (KR); Hyun-surk Kim, Suwon-si (KR); Sang-hoon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 11/187,858

(22) Filed: Jul. 25, 2005

(65) Prior Publication Data
US 2006/0081774 A1    Apr. 20, 2006

(30) Foreign Application Priority Data
Oct. 14, 2004  (KR) .................. 10-2004-0082077
Oct. 19, 2004  (KR) .................. 10-2004-0083585

(51) Int. Cl.
*G02B 26/08* (2006.01)
*G02B 7/182* (2006.01)
(52) U.S. Cl. .................. 359/212; 359/196; 359/871
(58) Field of Classification Search ............. None
See application file for complete search history.

(56) References Cited

U.S. PATENT DOCUMENTS
4,862,218 A    8/1989    Tsunoda et al.

2002/0051254 A1*   5/2002   Kaneko ................. 358/509

FOREIGN PATENT DOCUMENTS

| JP | 61-212819 | 9/1986 |
|---|---|---|
| JP | 01-277212 | 11/1989 |
| JP | 11-352427 | 12/1999 |
| JP | 2003-098460 | 4/2003 |
| JP | 2004-029109 | 1/2004 |
| KR | 95-11145 | 5/1995 |
| KR | 97-7530 | 2/1997 |

* cited by examiner

*Primary Examiner*—James Phan
(74) *Attorney, Agent, or Firm*—Roylance, Abrams, Berdo & Goodman, L.L.P.

(57) ABSTRACT

A mirror positioning structure for compensating skew and bow includes a mirror rotating member having a recess at one side to hold a mirror inserted therein and a rotation shaft protruding from an opposite side. A mirror position changing member has an opening through which the rotation shaft of the mirror rotating member passes such that the mirror rotating member is rotatably coupled with the mirror position changing member. A fixing member has a receiving space in one side so that the mirror position changing member moves rectilinearly within the receiving space.

25 Claims, 19 Drawing Sheets

MIRROR POSITIONING STRUCTURE FOR COMPENSATION OF SKEW AND BOW AND LASER SCANNING UNIT EMPLOYING THE SAME

CROSS-REFERENCE TO RELATED APPLICATION

This application claims the benefit under 35 U.S.C. § 119(a) of Korean Patent Application Nos. 10-2004-0082077, filed on Oct. 14, 2004, and 10-2004-0083585, filed on Oct. 19, 2004, in the Korean Intellectual Property Office, the entire disclosures of which are hereby incorporated by reference.

BACKGROUND OF THE INVENTION

1. Field of the Invention

The present invention relates to a mirror positioning structure that compensates for skew and bow, and a laser scanning unit employing the same. More particularly, the present invention relates to a structure that facilitates control of the rotation angle and the amount of rectilinear motion of a mirror that compensates for skew and bow, and a laser scanning unit employing the structure.

2. Description of the Related Art

Generally, a laser printer is a printing apparatus that forms a latent image on a photosensitive medium by scanning a laser beam emitted from a laser diode across the photosensitive medium and transfers the latent image to a medium such as paper, thereby reproducing an image. A laser scanning unit is an image forming device that generates a laser beam and forms an image on a photosensitive medium in a laser printer. FIGS. 1A and 1B are schematic diagrams of a conventional laser scanning unit 10. Referring to FIGS. 1A and 1B, the conventional laser scanning unit 10 includes a light source 11, a collimating lens 12, an aperture stop 13, a cylinder lens 14, a polygon mirror 15, a scanning lens 16, a mirror 17, and a photosensitive drum 18. The light source 11, the collimating lens 12, the aperture stop 13, the cylinder lens 14, the polygon mirror 15, the scanning lens 16, and the mirror 17 are housed in a separate frame 19 to prevent dust contamination and the like.

In such a structure, a light beam emitted from the light source 11 (such as a laser diode) is converted into a beam parallel with an optical axis by the collimating lens 12. The parallel beam is shaped by the aperture stop 13 and then converges in a sub-scanning direction through the cylinder lens 14, thereby forming a horizontal linear light with respect to the sub-scanning direction. Thereafter, due to the fast rotation of the polygon mirror 15, the horizontal linear light is moved in a main-scanning direction (that is, horizontally across a paper) at a uniform velocity and forms an image on the photosensitive drum 18 via the scanning lens 16 and the mirror 17. The scanning lens 16 has a consistent refractive index with respect to the optical axis and polarizes the light, which is reflected from the polygon mirror 15 at a uniform velocity, in the main-scanning direction, thereby focusing the light on the photosensitive drum 18.

In the laser scanning unit 10, the light beam passing through the scanning lens 16 must be scanned on the photosensitive drum 18 in a straight line in the main-scanning direction. However, due to assembly tolerances and aberrations, the light beam may slightly deviate in the sub-scanning direction and may not be scanned linearly along the main-scanning direction on the photosensitive drum 18, as shown in FIG. 3. Skew refers to the phenomenon that the ends A and B of a scanning line (that is, the track of a beam spot as it travels across a photoreceptor) are at different heights X1 and X2. Bow refers to a curve in the scanning line (which should be rectilinear). Skew and bow decrease printing precision, thereby degrading the quality of the picture. In a tandem type laser scanning unit used in a color laser printer, skew and bow are particularly problematic. For example, in a color laser printer using a tandem type laser scanning unit, color reproducibility greatly decreases when different amounts of bow occur on a plurality of photosensitive drums. The mirror 17 serves to compensate for skew and bow by appropriately adjusting an incident angle of the light beam.

FIG. 2 is a diagram of a conventional structure for adjusting the inclination of the mirror 17. In the conventional structure, a groove 25 is provided in the frame 19 such that a lower portion of the mirror 17 is obliquely inserted into the groove 25. A screw 22 is installed at a position on the frame 19 corresponding to an upper portion of the mirror 17. The screw 22 is rotated to appropriately adjust the mirror insertion depth and thereby adjust the inclination of the mirror 17. In addition, the mirror 17 is firmly fixed using a plate spring 30 which is fixed to the frame 19 using a screw 21.

Conventionally, to compensate for scanning distortion, the inclination of the mirror is adjusted to change the angle that the beam scans on the photosensitive drum. To more efficiently compensate for such distortion, however, the rotation angle of the mirror must be adjusted to align the angles at which a beam is scanned on the photosensitive drum. Simultaneously, the incident position of the beam on the scanning lens must be adjusted to compensate for an incident position error so that both skew and bow are efficiently compensated for at the same time. Thus, the conventional technique of compensating for scanning distortion by adjusting just the rotation angle of the mirror is not satisfactory.

Accordingly, there is a need for a new technique of simultaneously adjusting the incident angle and position of a scanning beam. In addition, there is a need for a supplementary technique that allows the mirror to be more firmly fixed.

SUMMARY OF THE INVENTION

An aspect of the present invention is to solve at least the above problems and/or disadvantages and to provide at least the advantages described below. Accordingly, an aspect of the present invention is to provide a mirror positioning structure for facilitating the control of the rotation angle and the amount of rectilinear motion of a mirror and a laser scanning unit employing the same.

The present invention provides a mirror positioning structure for mechanically compensating for skew and bow that occur due to an alignment error in a laser beam in a tandem type laser scanning unit, thereby increasing the quality of color printing.

According to an aspect of the present invention, a mirror positioning structure for a laser scanning unit includes a mirror rotating member with a recess at one side to hold a mirror inserted therein and a rotation shaft protruding from the opposite side. A mirror position changing member has an opening through which the rotation shaft of the mirror rotating member passes so that the mirror rotating member is rotatably coupled with the mirror position changing member. A fixing member has a receiving space in one side and receives the mirror position changing member so that it moves rectilinearly within the receiving space.

According to another aspect of the present invention, a laser scanning unit includes a light source emitting light, a scanner that scans the light emitted from the light source on a scanned surface to form an image on the scanned surface, a mirror in the optical path between the light source and the scanned surface to compensate for skew and bow, and a mirror positioning structure that adjusts the position and angle of the mirror. The mirror positioning structure includes a mirror rotating member with a recess at one side to hold a mirror inserted therein and a rotation shaft protruding from the opposite side. A mirror position changing member has an opening through which the rotation shaft of the mirror rotating member passes so that the mirror rotating member is rotatably coupled with the mirror position changing member. A fixing member has a receiving space in one side to receiving the mirror position changing member so that it moves rectilinearly within the receiving space. The fixing member is attached to an outer frame of the laser scanning unit.

According to still another aspect of the present invention, a mirror positioning structure is installed at a frame of a laser scanning unit to adjust a rotation angle and the amount of rectilinear motion of a mirror of the laser scanning unit. The mirror positioning structure includes a mirror holding member with a recess on one side to hold the mirror inserted thereto and a rotation shaft perpendicularly protruding from the opposite side. The rotation shaft has a tapered end with a predetermined curvature. A mirror position fixing member has an opening that fits with the tapered end of the rotation shaft. The opening has an inner diameter with the same curvature as the tapered end of the rotation shaft. The rotation shaft of mirror holding member is passes through the frame and couples with the mirror position fixing member attached to an outer surface of the frame.

The curvature of the tapered end of the rotation shaft included in the mirror holding member and the opening included in the mirror position fixing member may be hemispheric or conic. The tapered end of the rotation shaft and the inner diameter of the opening may be processed to have a surface that prevents sliding.

The mirror holding member may further include a cylindrical bar protruding from the tapered end of the rotation shaft, and the cylindrical bar may have a smaller diameter than the rotation shaft.

The mirror positioning structure may further include a mirror position guiding member that is passed through and fixed to the frame between the mirror holding member and the mirror position fixing member. The mirror position guiding member may include an opening through which the rotation shaft of the mirror holding member passes.

The opening included in the mirror position guiding member may be elongated to allow the amount of rectilinear motion of the mirror holding member to be adjusted.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1A:
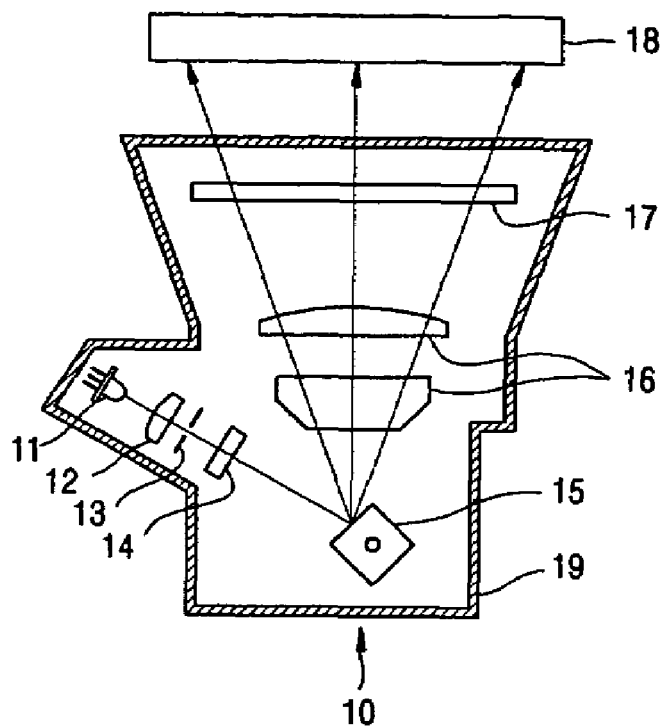
FIGS. 1A and 1B are schematic diagrams of a conventional laser scanning unit including a mirror.
Figure 1B:
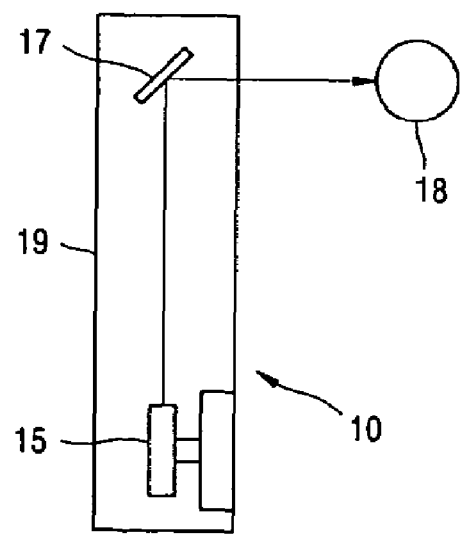
Figure 2:
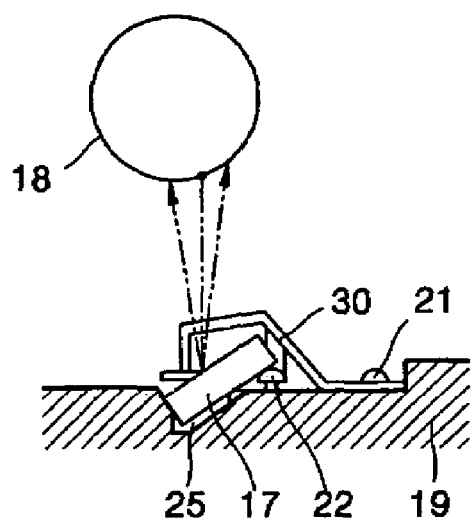
FIG. 2 is a diagram of a conventional structure for adjusting the inclination of the mirror and fixing the mirror.
Figure 3:
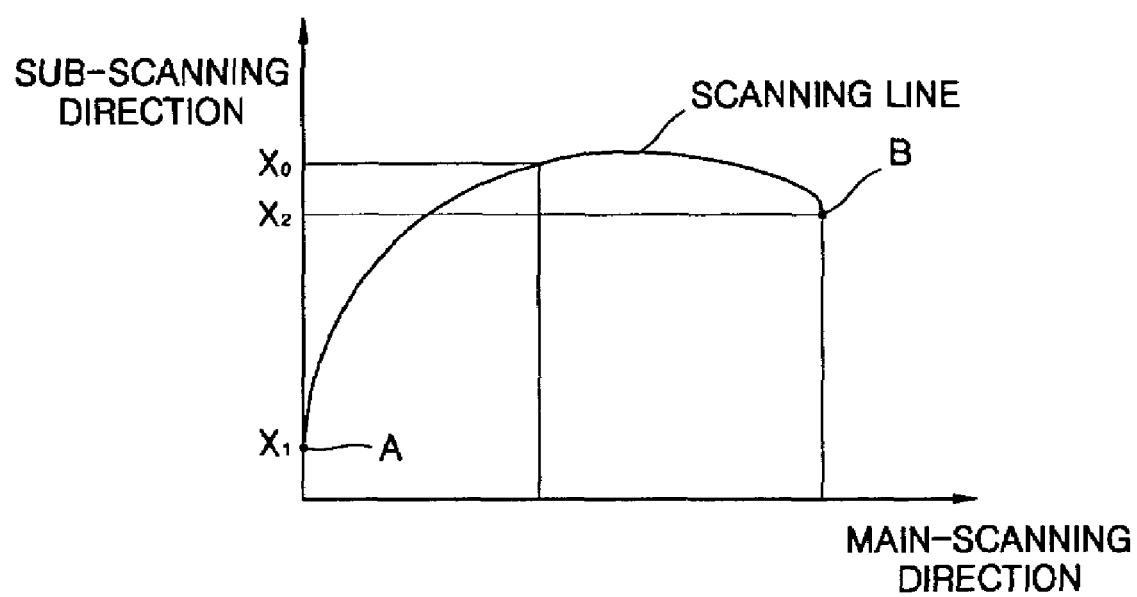
FIG. 3 is a graph illustrating skew and bow occurring in a typical laser scanning unit.
Figure 4A:
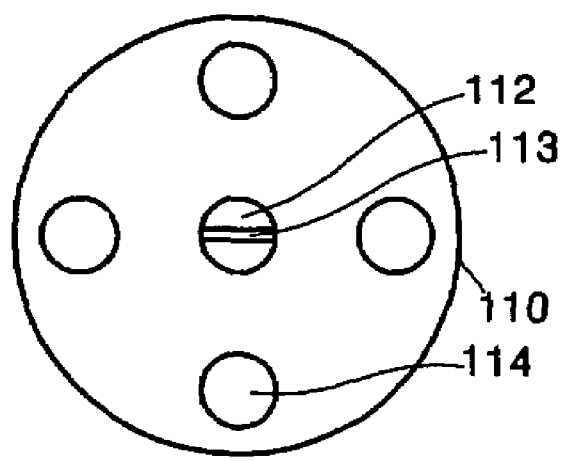
FIGS. 4A through 4D illustrate a mirror rotating member of a mirror positioning structure according to an embodiment of the present invention.
Figure 4B:
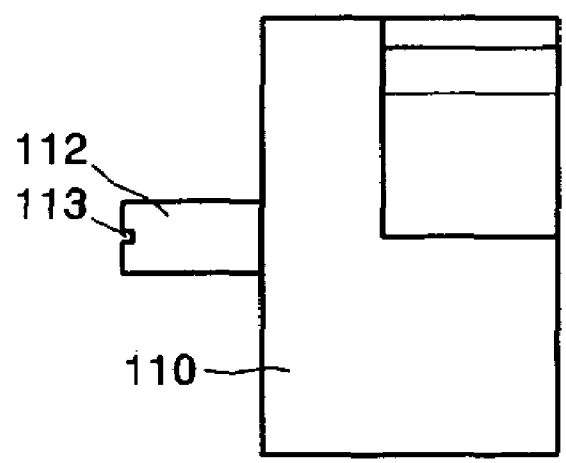
Figure 4C:
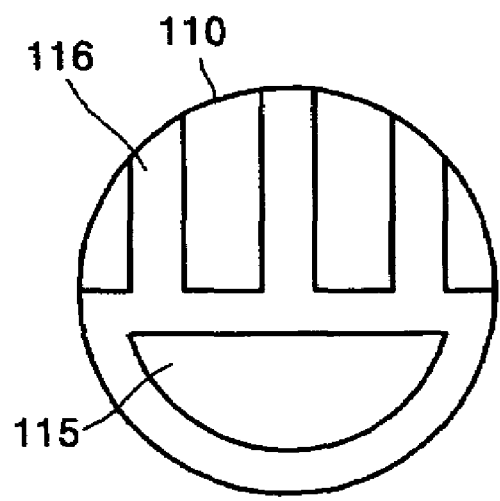
Figure 4D:
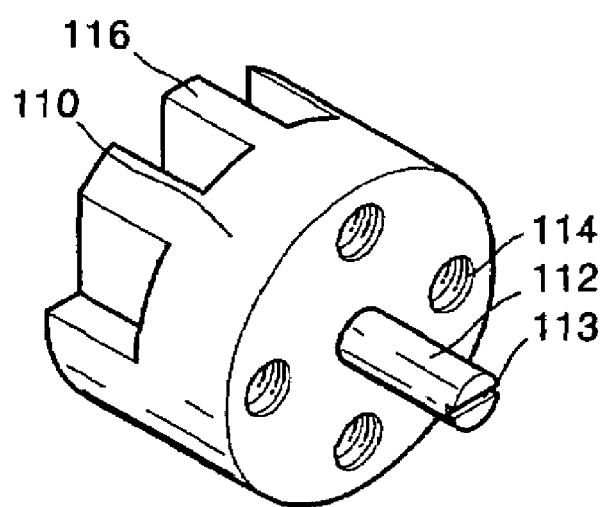
Figure 5A:
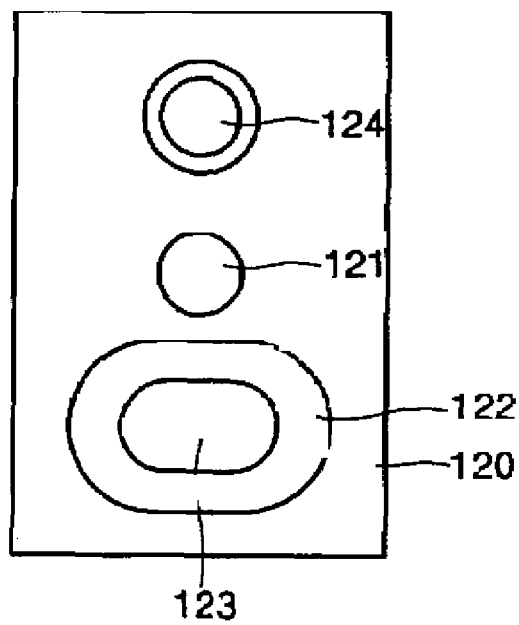
FIGS. 5A through 5D illustrate a mirror position changing member of a mirror positioning structure according to an embodiment of the present invention.
Figure 5B:
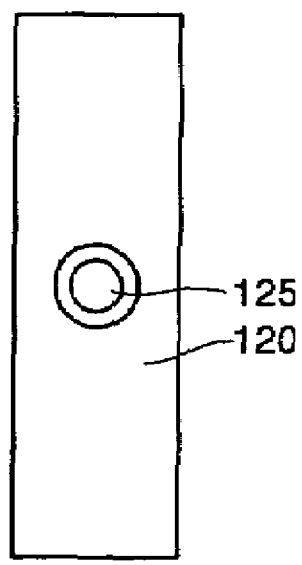
Figure 5C:
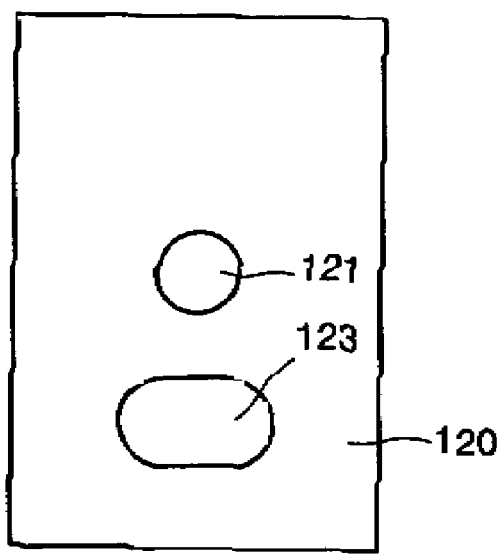
Figure 5D:
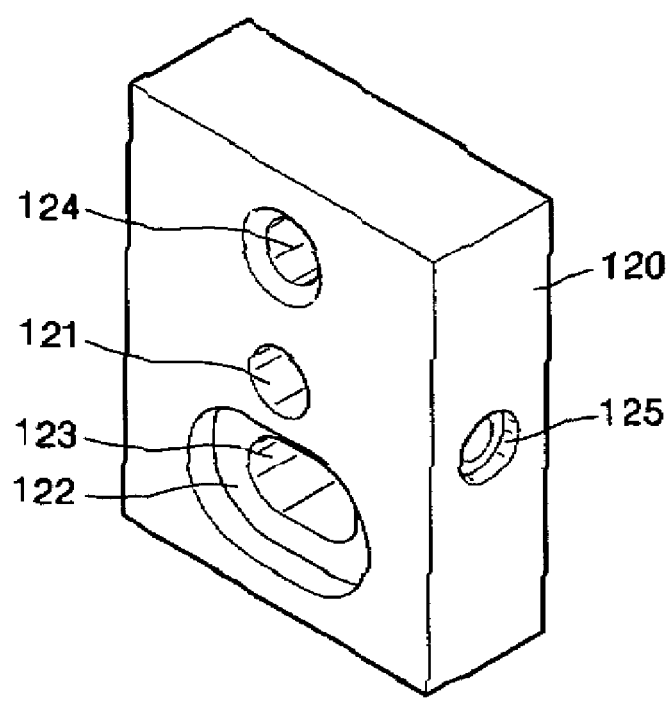

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A mirror positioning structure for a laser scanning unit according to an embodiment of the present invention includes a mirror rotating member that holds and rotates a mirror (FIGS. 4a through 4d), a mirror position changing member that rectilinearly moves the mirror (FIGS. 5A through 5D), and a fixing member that fixes the two members (FIGS. 5A through 5D).

FIGS. 4A through 4D illustrate a mirror rotating member 110 of a mirror positioning structure according to an embodiment of the present invention. FIGS. 4A, 4B, 4C, and 4D are front, side, rear, and perspective views, respectively, of the mirror rotating member 110. Referring to FIGS. 4A through 4D, a rotation shaft 112 protrudes from the front surface of the mirror rotating member 110. A mirror insertion recess 115 into which a mirror (not shown) is inserted is provided at the rear of the mirror rotating member 110 to hold the mirror. When the mirror rotating member 110 rotates around the rotation shaft 112, the mirror inserted into the mirror insertion recess 115 also rotates so that the inclination of the mirror can be adjusted. To facilitate the rotation of the mirror rotating member 110, a groove 113 formed as a straight line is provided on the end of the rotation shaft 112. As a result, during assembly, the mirror rotating member 110 can be easily rotated using a tool like a screwdriver. Although in the illustrated embodiment the groove 113 is a straight line, it may have any other suitable shape. At least one rotation stop hole 114 is provided on the mirror rotating member 110 around the rotation shaft 112. After the inclination of the mirror is adjusted, a rotation stopper (not shown) is inserted into the rotation stop hole 114 to prevent the mirror from rotating further, which will be described in detail later. A plurality of ribs 116 are provided beside the mirror insertion recess 115 on the rear of the mirror rotating member 110 to prevent deformation of the mirror insertion recess 115.

FIGS. 5A through 5D illustrate a mirror position changing member 120 of a mirror positioning structure according to an embodiment of the present invention. FIGS. 5A, 5B, 5C, and 5D are front, side, rear and perspective views, respectively, of the mirror position changing member 120. Referring to FIGS. 5A through 5D, an opening 121 is provided in a central portion of the mirror position changing member 120 to allow the rotation shaft 112 of the mirror rotating member 110 to pass through. As a result, the mirror rotating member 110 can be rotatably coupled with the mirror position changing member 120. A rotation stopper through-hole 123 is provided below the opening 121. The rotation stopper is passed through the rotation stopper through-hole 123 and inserted into the rotation stop hole 114 of the mirror rotating member 110 so that the mirror rotating member 110 and the mirror position changing member 120 are fixedly coupled with each other. The rotation stopper through-hole 123 is elongated so that the mirror rotating member 110 can be coupled with the mirror position changing member 120 within a predetermined range of angles. A groove 122 having a predetermined depth is provided around the rotation stopper through-hole 123 to facilitate reliable installation of the rotation stopper. Meanwhile, a rectilinear motion stop hole 124 is provided above the opening 121 on the front side of the mirror position changing member 120. A rectilinear motion adjustor hole 125 into which a rectilinear motion adjustor is inserted is provided in at least one side of the mirror position changing member 120, which will be described in detail later.

Figure 6A:
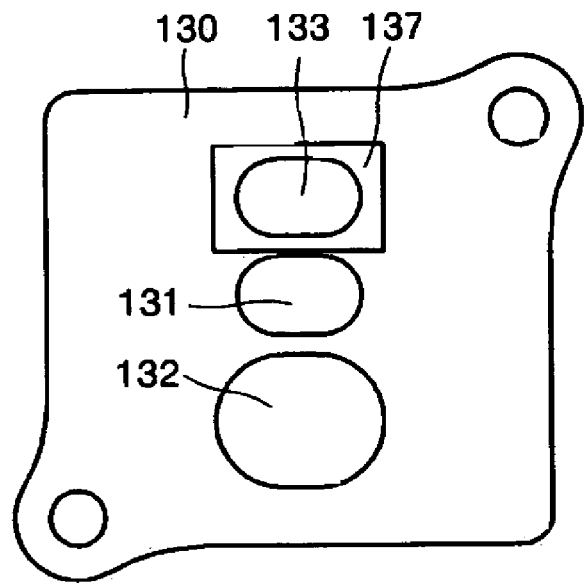
FIGS. 6A through 6D illustrate a fixing member of a mirror positioning structure according to an embodiment of the present invention.
Figure 6B:
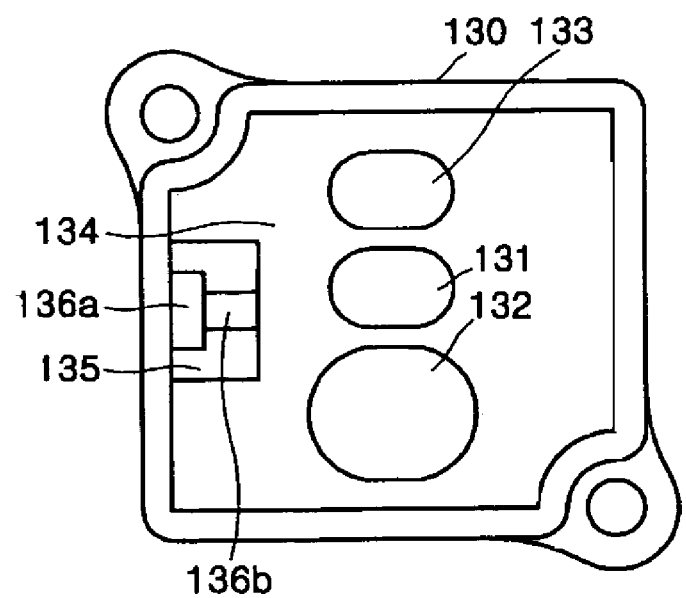
Figure 6C:
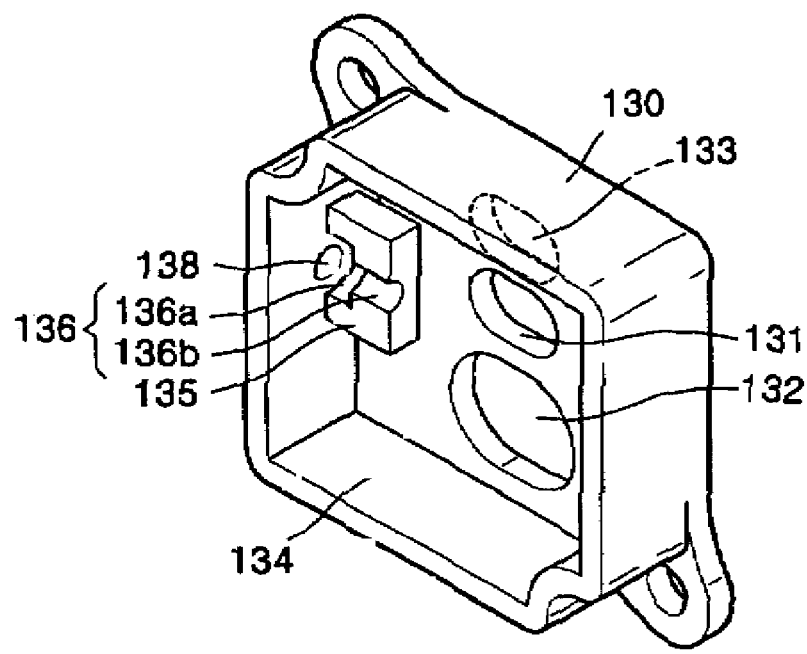
Figure 6D:
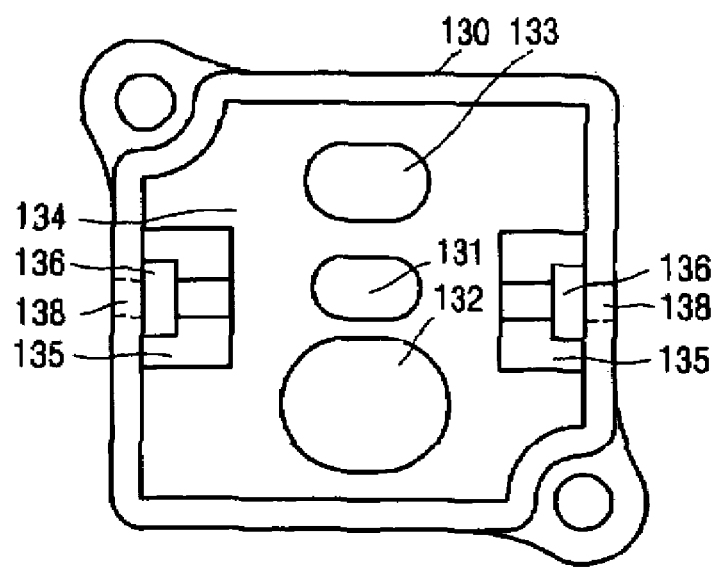

FIGS. 6A through 6D illustrate a fixing member 130 of a mirror positioning structure according to an embodiment of the present invention. FIGS. 6A, 6B, and 6C are front, rear, and perspective views, respectively, of the fixing member 130. FIG. 6D is a rear view of an alternative fixing member 130. Referring to FIGS. 6A through 6C, a receiving space 134 is provided on the rear of the fixing member 130 such that the mirror position changing member 120 can move rectilinearly within the receiving space 134. Through-holes 131, 132, and 133 are provided, and correspond with the opening 121 of the mirror position changing member 120, the rotation stopper through-hole 123, and the rectilinear motion stop hole 124, respectively. The through-holes 131 and 133 that correspond to the opening 121 and the rectilinear motion stop hole 124 are elongated so that the amount of rectilinear motion of the mirror position changing member 120 can be adjusted within a predetermined range. Similarly, the through-hole 132 corresponding to the rotation stopper through-hole 123 is elongated so that the mirror rotating member 110 can be adjusted within a predetermined range of angles. A groove 137 having a predetermined depth is provided around the through-hole 133 corresponding to the rectilinear motion stop hole 124, as shown in FIG. 6A, so that the rectilinear motion stopper (which is described later) is stable when installed. The rotation shaft 112 of the mirror rotating member 110 passes through the through-hole 131.

In addition, as shown in FIGS. 6B and 6C, the fixing member 130 has a rectilinear motion adjustor mount 135 to stably couple the rectilinear motion adjustor to the side of the mirror position changing member 120. The rectilinear motion adjustor mount 135 has a groove 136 that receives the rectilinear motion adjustor. The groove 136 includes a larger portion 136a having a large diameter to receive the head of the rectilinear motion adjustor and a smaller portion 136b having a relatively smaller diameter to receive the body of the rectilinear motion adjustor. The rectilinear motion adjustor is rotated to rectilinearly move the mirror position changing member 120 within the receiving space 134 of the fixing member 130. To allow the rectilinear motion adjustor to be easily rotated by an external operation, the fixing member 130 has an adjustment hole 138 in its side. The fixing member shown in FIGS. 6B and 6C has one rectilinear motion adjustor mount 135 on one side of the fixing member 130. However, as shown in FIG. 6D, two symmetrical rectilinear motion adjustor mounts 135 may be provided at opposite sides of the fixing member 130.

Figure 7A:
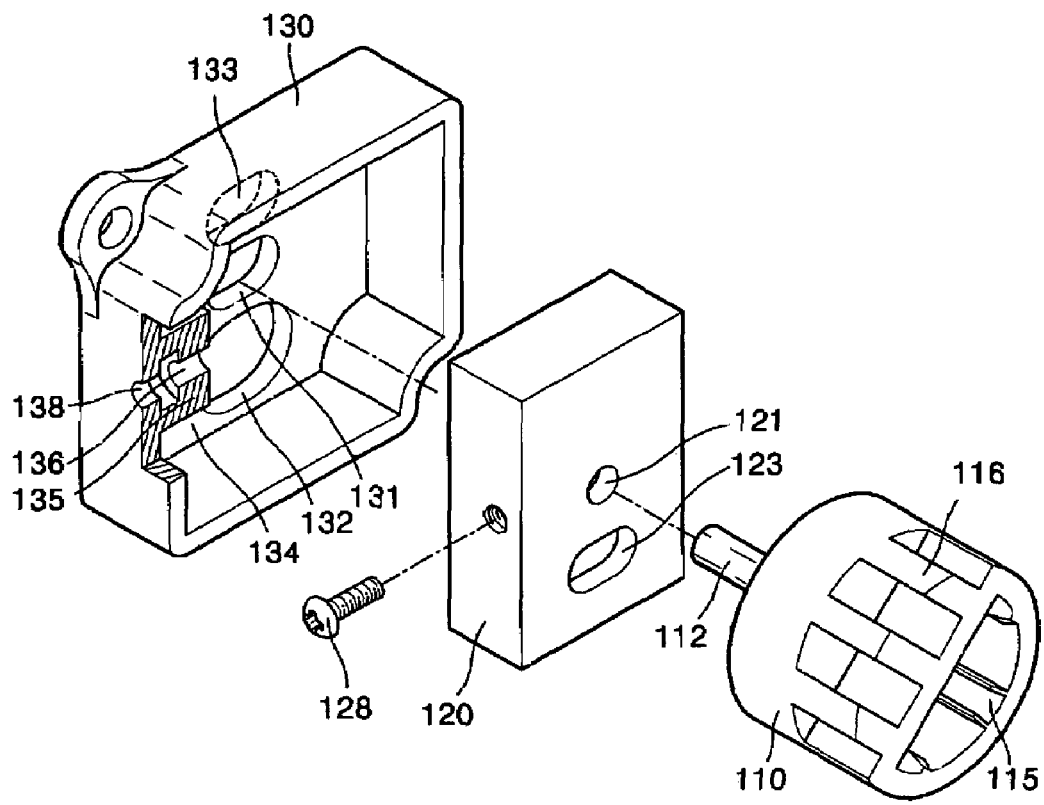
FIGS. 7A and 7B illustrate the connection among the mirror rotating member, the mirror position changing member, and the fixing member.
Figure 7B:
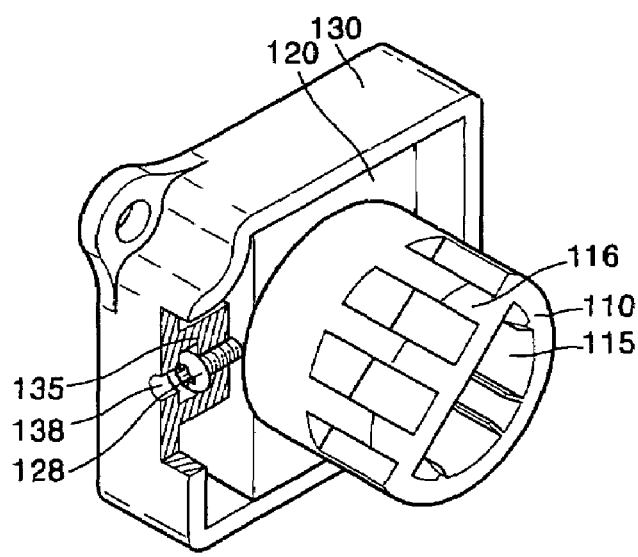

FIGS. 7A and 7B illustrate the connection among the mirror rotating member 110, the mirror position changing member 120, and the fixing member 130. Referring to FIG. 7A, the mirror position changing member 120 is received in the receiving space 134 of the fixing member 130. A rectilinear motion adjustor 128 is inserted through the rectilinear motion adjustor hole 125 at the side of the mirror position changing member 120 and positioned in the groove 136 on the rectilinear motion adjustor mount 135. A screw may be used as the rectilinear motion adjustor 128. The head of the rectilinear motion adjustor 128 is exposed to the outside by the adjustment hole 138. A tool such as a screwdriver may be inserted through the adjustment hole 138 to rotate the rectilinear motion adjustor 128. Meanwhile, the rotation shaft 112 of the mirror rotating member 110 is inserted through the opening 121 of the mirror position changing member 120 and the through-hole 131 of the fixing member 130 so that the mirror rotating member 110 is coupled with the mirror position changing member 120 and the fixing member 130. The fixing member 130 may be attached to an outer frame (not shown) of a laser scanning unit. FIG. 7B illustrates a state where the mirror rotating member 110, the mirror position changing member 120, and the fixing member 130 are coupled with one another.

Figure 8A:
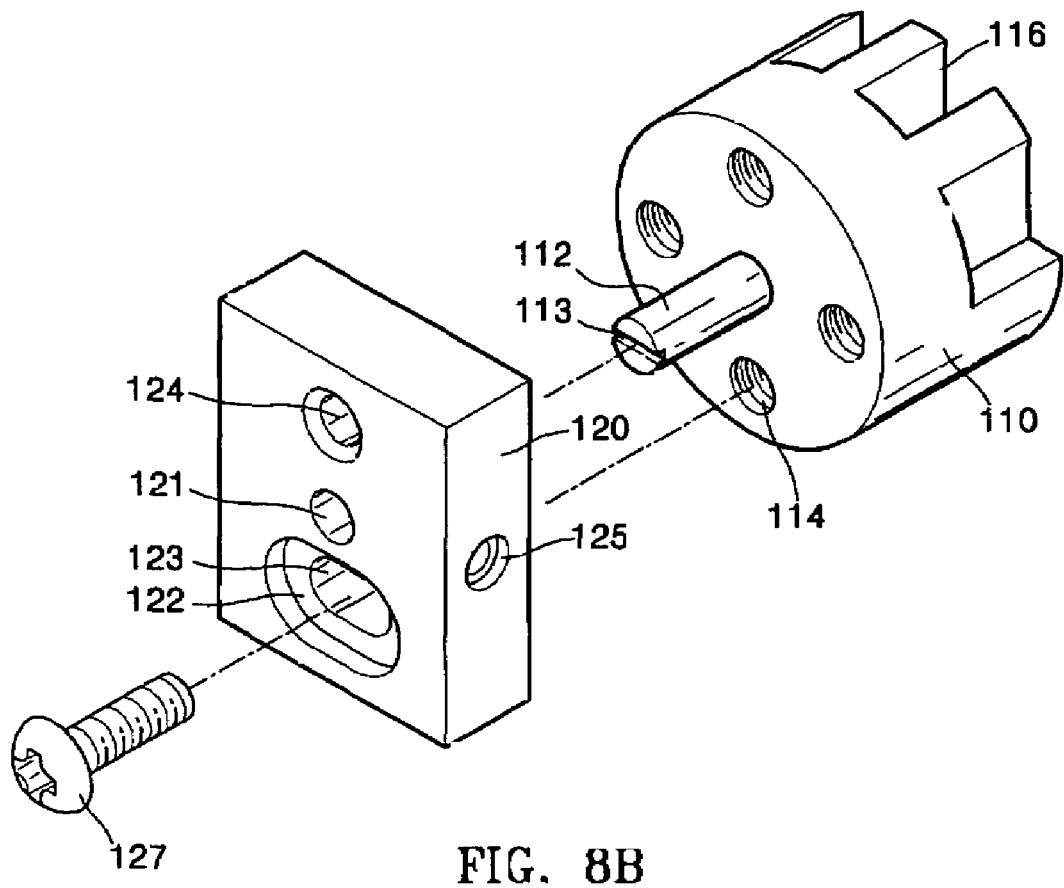
FIGS. 8A and 8B respectively illustrate the connection and the operation between the mirror rotating member and the mirror position changing member.
Figure 8B:
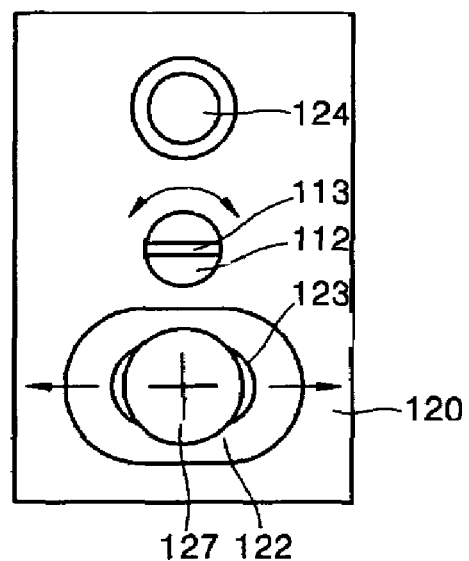

FIGS. 8A and 8B respectively illustrate the connection and the operation between the mirror rotating member 110 and the mirror position changing member 120. Referring to FIG. 8A, the rotation shaft 112 of the mirror rotating member 110 is inserted through the opening 121 of the mirror position changing member 120 so that the mirror rotating member 110 is rotatably coupled with the mirror position changing member 120. A rotation stopper 127 is passed through the rotation stopper through-hole 123 and is loosely inserted into the rotation stop hole 114 of the mirror rotating member 110. A screw may be used as the rotation stopper 127. FIG. 8B is a front view of the assembly described with reference to FIG. 8A. The inclination of the mirror can be adjusted by rotating the rotation shaft 112 using, for example, a screwdriver. When the rotation shaft 112 is rotated, the loosely inserted rotation stopper 127 moves within the rotation stopper through-hole 123 (that has an elongated shape). After the inclination of the mirror is decided, the rotation stopper 127 is rotated and tightened so that the mirror position changing member 120 and the mirror rotating member 110 are firmly fixed to each other. As a result, the inclination of the mirror is prevented from changing.

Figure 9A:
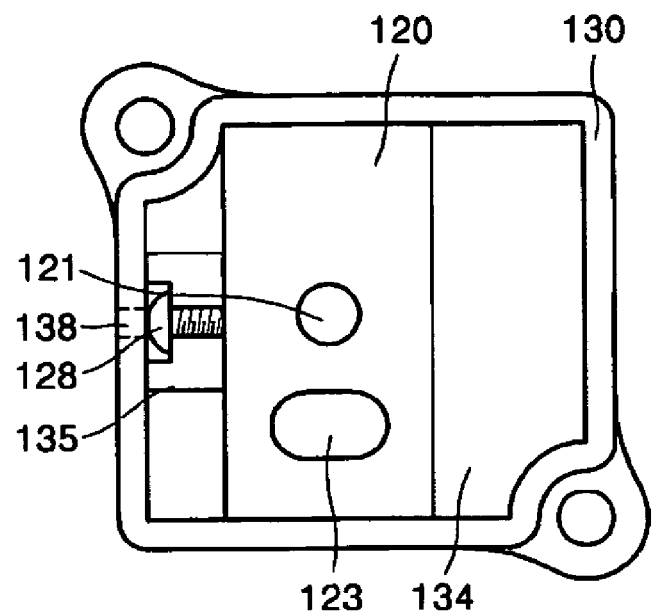
FIGS. 9A through 9D illustrate the rectilinear motion of the mirror position changing member.
Figure 9B:
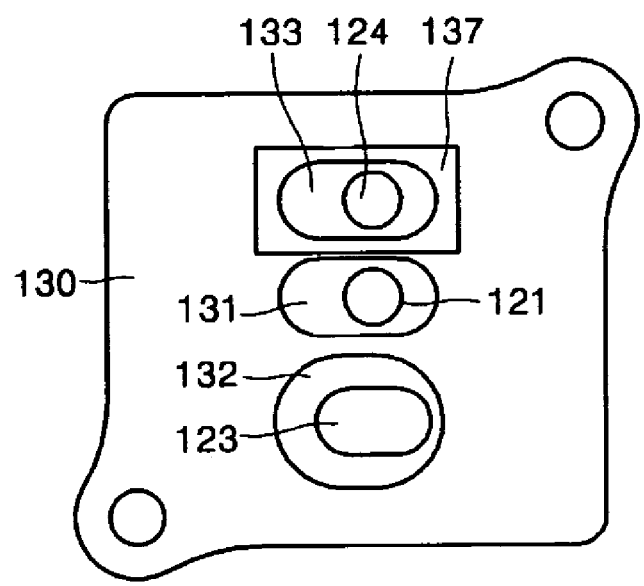

FIGS. 9A through 9D illustrate the rectilinear motion of the mirror position changing member 120. For clarity of description, the mirror rotating member 110 coupled with the mirror position changing member 120 is not illustrated in the drawings. Referring to FIG. 9A, which is a rear view, when the rectilinear motion adjustor 128 is inserted deeply into the mirror position changing member 120, the mirror position changing member 120 is positioned at the left side of the receiving space 134 of the fixing member 130. FIG. 9B is a front view showing the position when the mirror position changing member 120 and the fixing member 130 are coupled with each other as shown in FIG. 9A. Referring to FIG. 9B, when the rectilinear motion adjustor 128 is inserted deeply into the mirror position changing member 120, the rectilinear motion stop hole 124 of the mirror position changing member 120 is positioned at the right side of the through-hole 133 of the fixing member 130. Similarly, the opening 121 of the mirror position changing member 120 is positioned at the right side of the through-hole 131 of the fixing member 130 when viewed from the front.

Figure 9C:
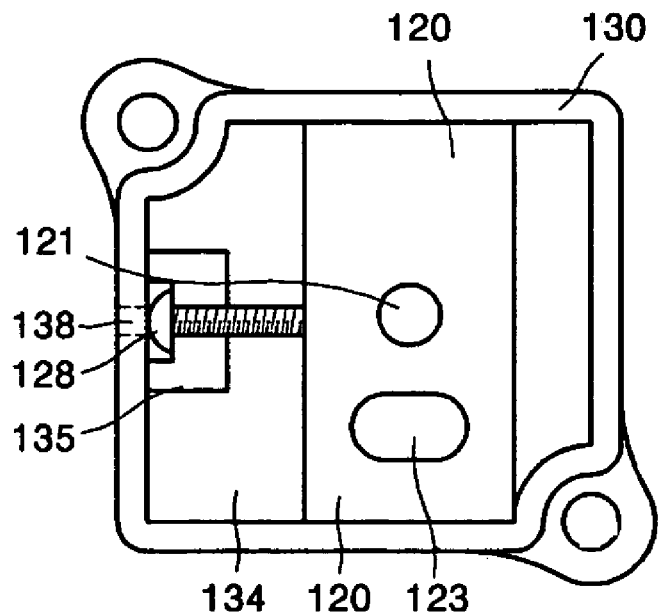
Figure 9D:
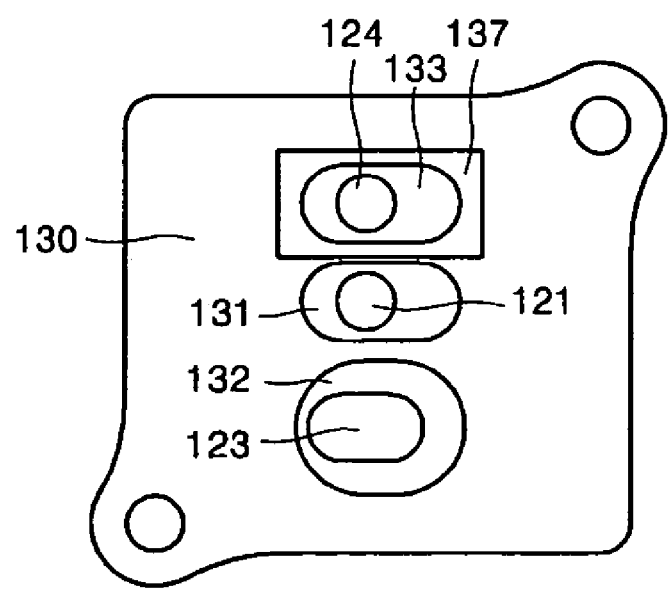

To adjust the position of the mirror position changing member 120, a tool such as a screwdriver is inserted through the adjustment hole 138 and rotated to rotate the rectilinear motion adjustor 128 so that the rectilinear motion adjustors 28 is loosened with respect to the mirror position changing member 120. Here, since the rectilinear motion adjustor 128 is fixed at the rectilinear motion adjustor mount 135 of the fixing member 130, the mirror position changing member 120 moves to the right side of the receiving space 134 when viewed from the rear, as shown in FIG. 9C. FIG. 9D is a front view showing the position when the mirror position changing member 120 and the fixing member 130 are coupled with each other as shown in FIG. 9C. Referring to FIG. 9D, when the rectilinear motion adjustor 128 is loosened with respect to the mirror position changing member 120, the rectilinear motion stop hole 124 of the mirror position changing member 120 moves to the left side of the through-hole 133 of the fixing member 130. Similarly, the opening 121 of the mirror position changing member 120 moves to the left side of the through-hole 131 of the fixing member 130 when viewed from the front. After the position of the mirror position changing member 120 is decided through the above-described operation, a rectilinear motion stopper 129 (see FIG. 10C) is inserted through the rectilinear motion stop hole 124 and tightened so that the mirror position changing member 120 is coupled and fixed to the fixing member 130.

Figure 10A:
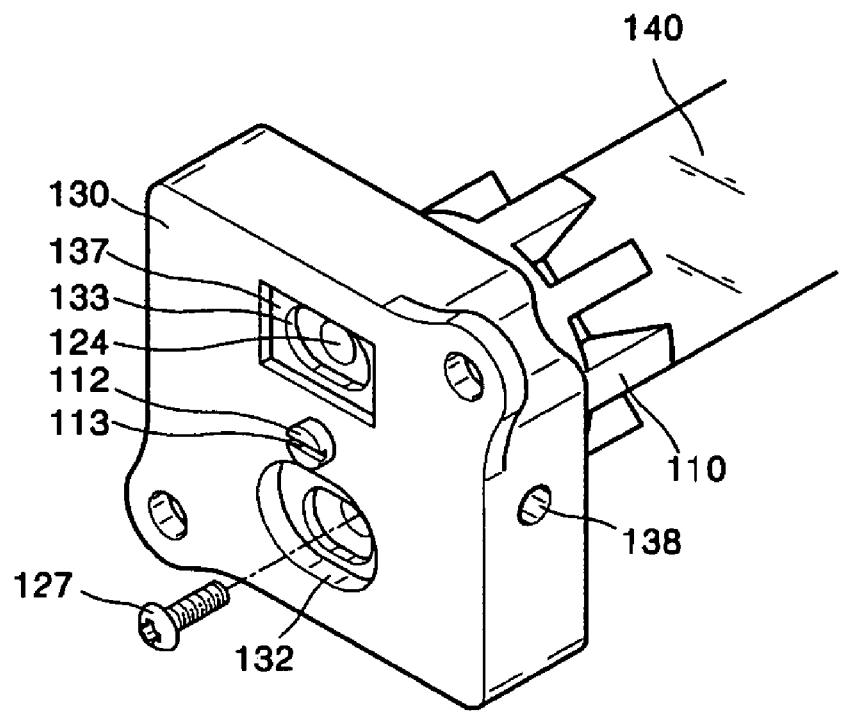
FIGS. 10A through 10C are perspective views illustrating the operation of a mirror positioning structure according to an embodiment of the present invention.
Figure 10B:
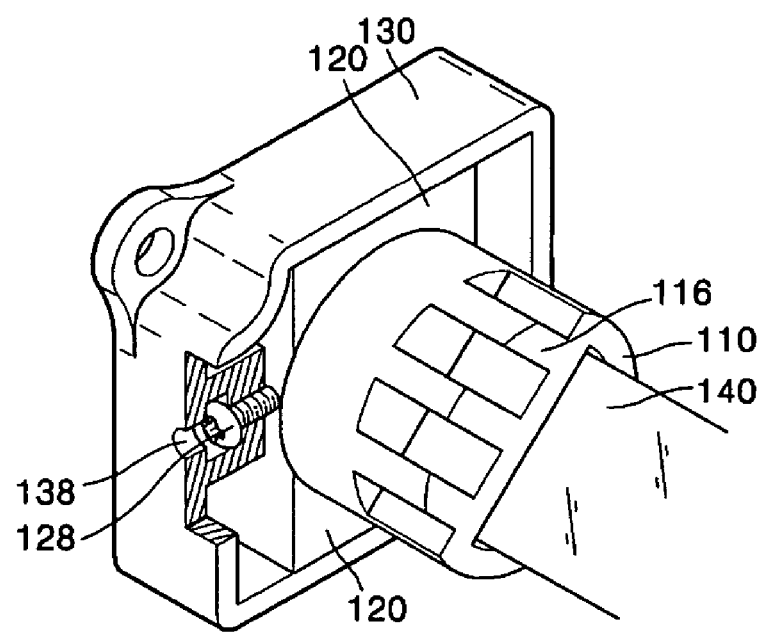
Figure 10C:
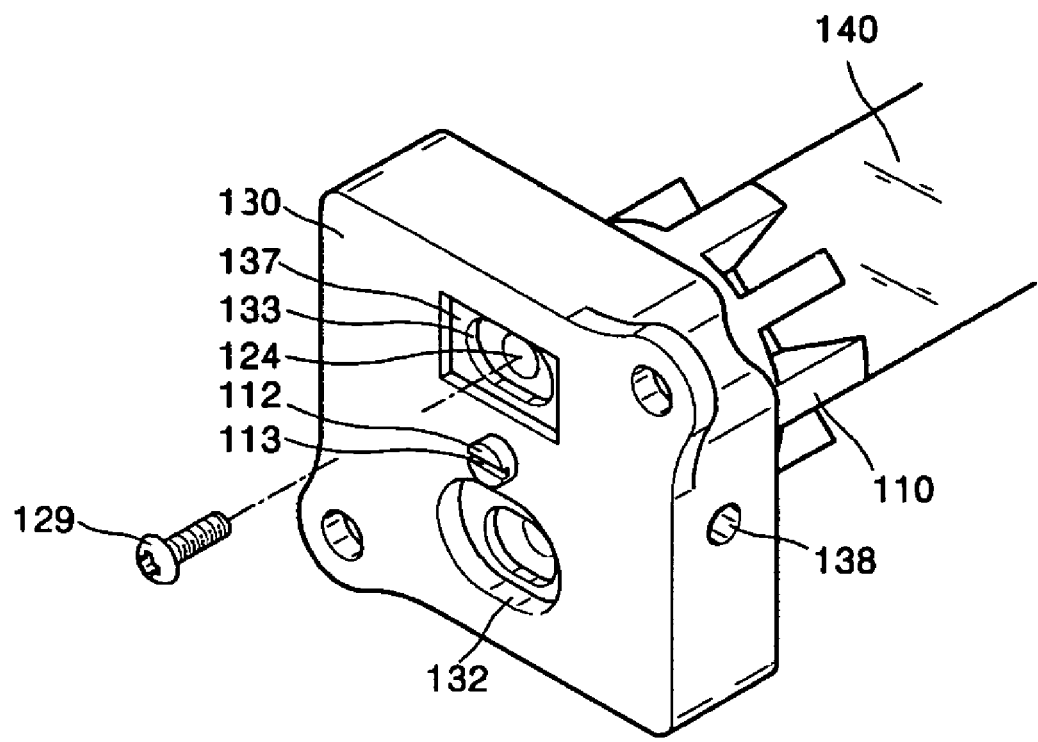

FIGS. 10A through 10C are perspective views illustrating the operation of a mirror positioning structure according to an embodiment of the present invention. Referring to FIG. 10A, the rotation shaft 112 of the mirror rotating member 110, which extends out of the fixing member 130, is rotated to adjust the inclination of a mirror 140 coupled to the mirror rotating member 110. After the inclination of the mirror 140 is decided, a tool such as a screwdriver is inserted through the through-hole 132 of the fixing member 130 and rotated to tighten the rotation stopper 127 so that the mirror rotating member 110 is firmly fixed to the mirror position changing member 120.

Thereafter, referring to FIG. 10B, a tool such as a screwdriver is inserted through the adjustment hole 138 provided on one side of the fixing member 130 and rotated to rotate the rectilinear motion adjustor 128 so that the position of the mirror position changing member 120 is adjusted. When the mirror position changing member 120 is moved, the mirror 140 coupled to the mirror rotating member 110 is also moved. When the position of the mirror 140 is decided by such an operation, referring to FIG. 10C, the rectilinear motion stopper 129 is inserted through the through-hole 133 of the fixing member 130 and received in the rectilinear motion stop hole 124 such that the mirror position changing member 120 is firmly fixed to the fixing member 130. Here, the rectilinear motion stopper 129 may be a screw.

In a mirror positioning structure according to the above-described embodiment of the present invention, it can be difficult to position the mirror 140 to be oblique to a frame. In other words, when the mirror 140 becomes oblique to the frame, the mirror position changing member 120 and the fixing member 130 are not parallel to the frame. Accordingly, when the mirror 140 is forcedly positioned so that it is oblique to the frame, the entire assembly becomes unstable. Furthermore, the mirror 140 and the frame may be seriously warped.

Following is a description of additional exemplary embodiments of the mirror positioning structure of the present invention that can overcome the above-described difficulty.

Figure 11:
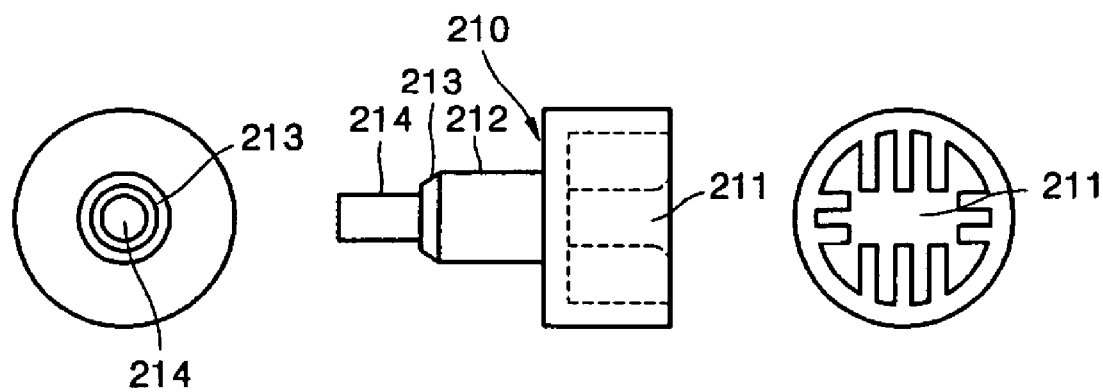
FIG. 11 illustrates a mirror holding member of a mirror positioning structure according to an embodiment of the present invention.

FIG. 11 illustrates a mirror holding member 210 of a mirror positioning structure according to an embodiment of the present invention. In FIG. 11, front, side and rear views are sequentially illustrated from left to right. A rotation shaft 212 extends perpendicularly from a front side of the mirror holding member 210. A mirror insertion recess 211 is provided on a rear side of the mirror holding member 210 to hold a mirror (not shown) inserted therein. When the mirror holding member 210 rotates around the rotation shaft 212, the mirror inserted into the mirror insertion recess 211 also rotates, and therefore, the inclination of the mirror can be adjusted. A curved portion 213 that tapers with a predetermined curvature is provided at an end of the rotation shaft 212. The curved portion 213 may be hemispheric or conic. A cylindrical bar 214 having a smaller diameter than the rotation shaft 212 protrudes from the curved portion 213. The mirror holding member 210 can be rotated or the position changed by holding and operating the cylindrical bar 214 when adjusting the rotation angle and the amount of rectilinear motion of the mirror.

Figure 12:
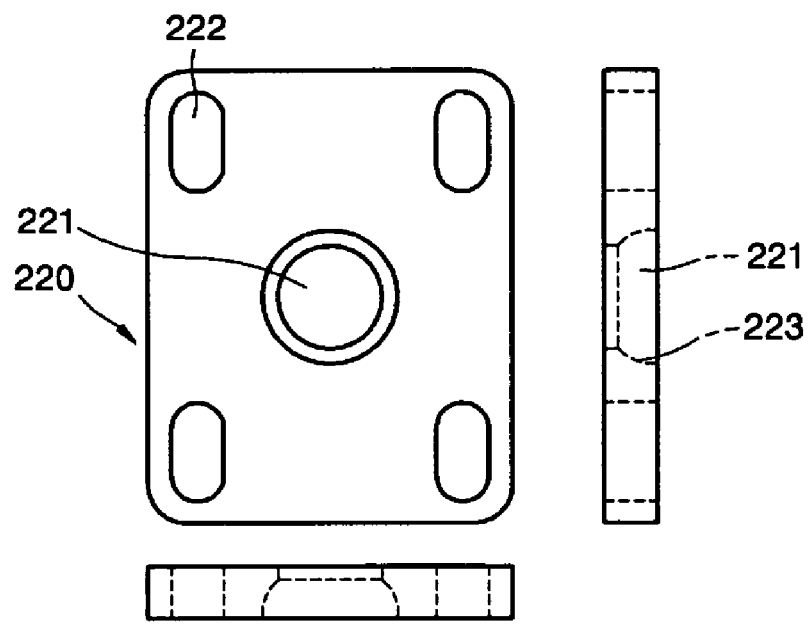
FIG. 12 illustrates a mirror position fixing member of a mirror positioning structure according to an embodiment of the present invention.

FIG. 12 illustrates a mirror position fixing member 220 of a mirror positioning structure according to an embodiment of the present invention. In FIG. 12, a front view is illustrated at the center, a bottom view is illustrated at the bottom, and a side view is illustrated on the right. An opening 221 that fits with the curved portion 213 of the rotation shaft 212 of the mirror holding member 210 is provided at a central portion of the mirror position fixing member 220. An inner diameter 223 of the opening 221 has the same curvature as the curved portion 213 so that the opening 221 exactly fits with the curved portion 213 provided at the end of the rotation shaft 212. Locking holes 222, into which a locking member (not shown) is inserted, are provided near each corner of the mirror position fixing member 220 to fix the mirror position fixing member 220 to an outer frame 240 (see FIG. 13) of, for example, a laser scanning unit. A locking hole 222 is elongated so that the amount of rectilinear motion of the mirror position fixing member 220 can be adjusted within a predetermined range.

Figure 13:
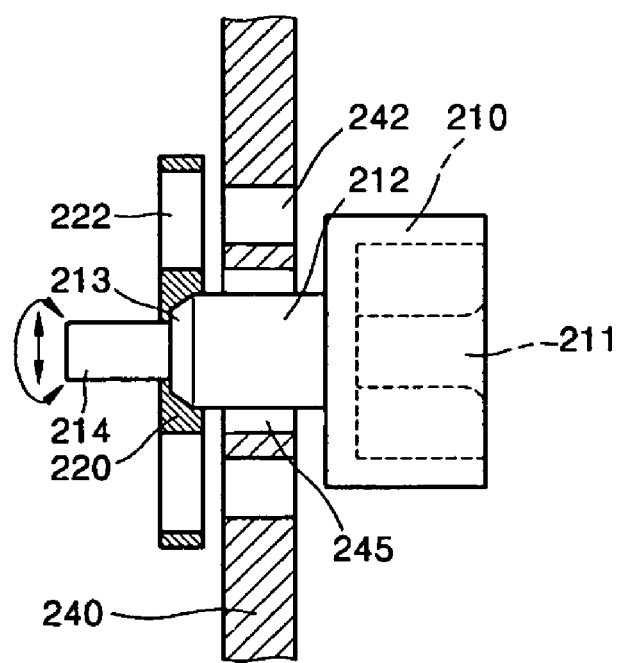
FIG. 13 illustrates an assembled mirror positioning structure according to an embodiment of the present invention.

FIG. 13 illustrates an assembled mirror positioning structure according to an embodiment of the present invention. The mirror holding member 210 that supports and rotates the mirror is positioned within a laser scanning unit. The rotation shaft 212 of the mirror holding member 210 passes through an opening 245 of the frame 240 and extends out of the frame 240. As described above, the end of the rotation shaft 212 has a curved portion 213. The cylindrical bar 214 protrudes from the center of the curved portion 213 to enable the mirror holding member 210 to be manually or automatically rotated in an axial direction and moved in a direction parallel to the frame 240. The opening 245 of the frame 240 has a guiding plane with an elongated shape so that the amount of rectilinear motion of the mirror holding member 210 can be adjusted within a predetermined range. In other words, the breadth of the opening 245 is the same as the diameter of the rotation shaft 212 and the length of the opening 245 is the same as the sum of a lengthwise moving distance of the mirror holding member 210, the diameter of the rotation shaft 212, and a tolerance involved in the tilt of the rotation shaft 212.

In this situation, skew and bow are compensated for by rotating the mirror holding member 210 in the axial direction and moving the mirror holding member 210 in a direction parallel to the frame 240, and then fixing the position of the mirror holding member 210. To fix the mirror holding member 210, the mirror position fixing member 220 is positioned outside the frame to be in close contact with the mirror holding member 210 so that the mirror position fixing member 220 is fixed to the frame 240. The mirror position fixing member 220 is fixed to the frame 240 by inserting locking members (not shown) into the locking holes 222 provided near each corner of the mirror position fixing member 220 and locking holes 242 provided in the frame 240. Here, the cylindrical bar 214 of the mirror holding member 210 passes through the opening 221 of the mirror position fixing member 220, and the curved portion 213 of the mirror holding member 210 fits with the inner diameter 223 of the opening 221. The inner diameter 223 of the opening 221 and the curved portion 213 have surfaces having the same curvature so that they precisely and tightly contact each other.

Since the mirror holding member 210 and the mirror position fixing member 220 have surfaces with the same curvature, even if the mirror holding member 210 becomes oblique to the frame 240 during the axial rotation and the parallel move, the mirror position fixing member 220 is fixed parallel to the frame 240. Accordingly, the mirror holding member 210 and the mirror position fixing member 220 are stably fixed to the frame 240 while compensating for skew and bow. To minimize changes in the relative position between the mirror holding member 210 and the mirror position fixing member 220 due to impact or the like after adjusting the compensation of skew and bow, the surface roughness of the curved portion 213 of the mirror holding member 210 and the inner diameter 223 of the mirror position fixing member 220 may be adjusted during manufacturing, such as by molding. Alternatively, a surfacing process may be performed to form a slide resistant coating on the surfaces of the curved portion 213 and the inner diameter 223.

Figure 14A:
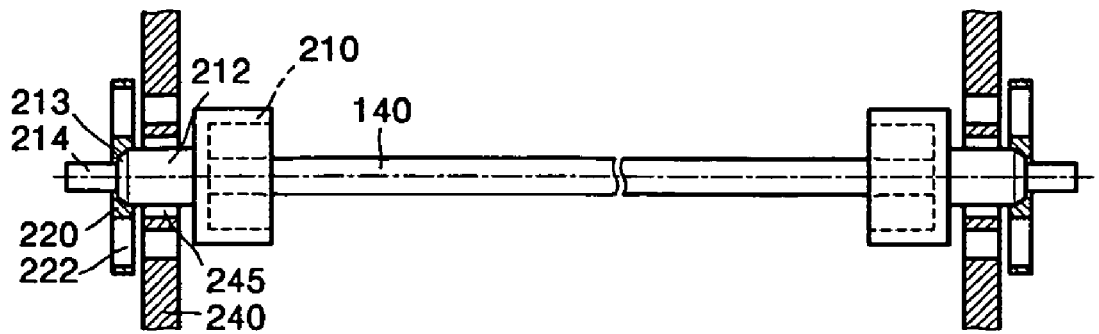
FIGS. 14A through 14C illustrate the operation of a mirror positioning structure according to another embodiment of the present invention.
Figure 14B:
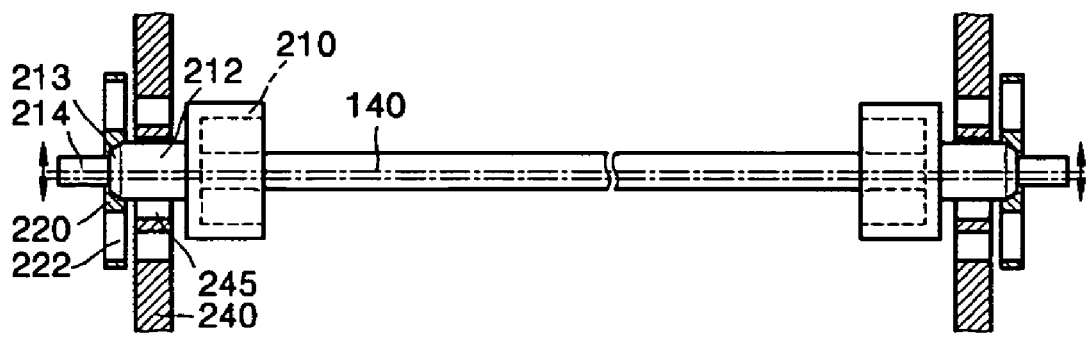
Figure 14C:
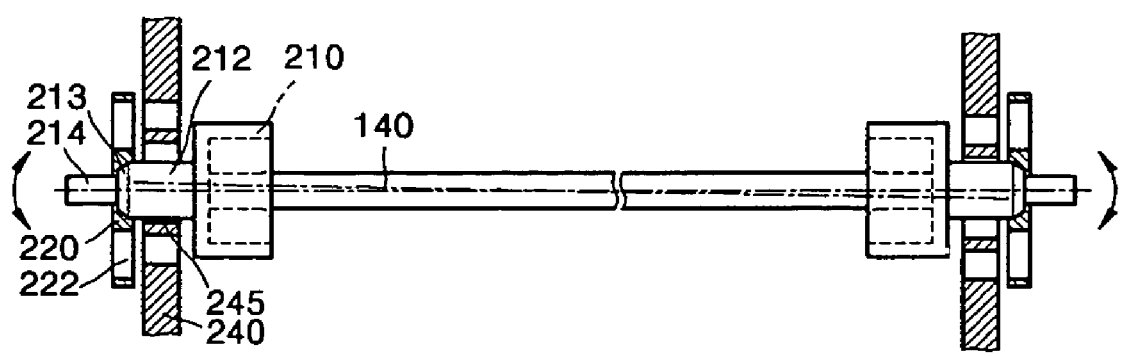

FIGS. 14A through 14C illustrate the operation of a mirror positioning structure according to another embodiment of the present invention. After two mirror holding members 210 are coupled with opposite ends of the mirror 140, the mirror holding members 210 are inserted into the frame 240. Thereafter, two mirror position fixing members 220 are installed at the mirror holding members 210. Either, or both, of the mirror holding members 210 are rotated or moved to adjust the rotation angle and the amount of rectilinear motion of the mirror 140. After the rotation angle and the amount of rectilinear motion of the mirror 140 are adjusted, the mirror position fixing members 220 are fixed to the frame 240. Here, the mirror 140 may be positioned so that the central axis of the mirror 140 is aligned with a base line as shown in FIG. 14A, so that the central axis of the mirror 140 is displaced in parallel from the base line as shown in FIG. 14B, or so that the central axis of the mirror 140 is oblique to the base line as shown in FIG. 14C. When the mirror 140 is moved in parallel from the base line and fixed as shown in FIG. 14B, the mirror position fixing members 220 at opposite sides are moved in the same direction and then fixed to the frame 240. When the mirror 140 is fixed to be oblique to the base line as shown in FIG. 14C, the mirror position fixing members 220 at opposite sides are moved in opposite directions and then fixed to the frame 240. In any case where the position of the mirror 140 is changed as shown in FIGS. 14B and 14C, due to the surfaces having the same curvature in the mirror holding members 210 and the mirror position fixing members 220, respectively, the mirror holding members 210 and the mirror position fixing members 220 are stably fixed to the frame 240 while compensating for skew and bow.

Figure 15:
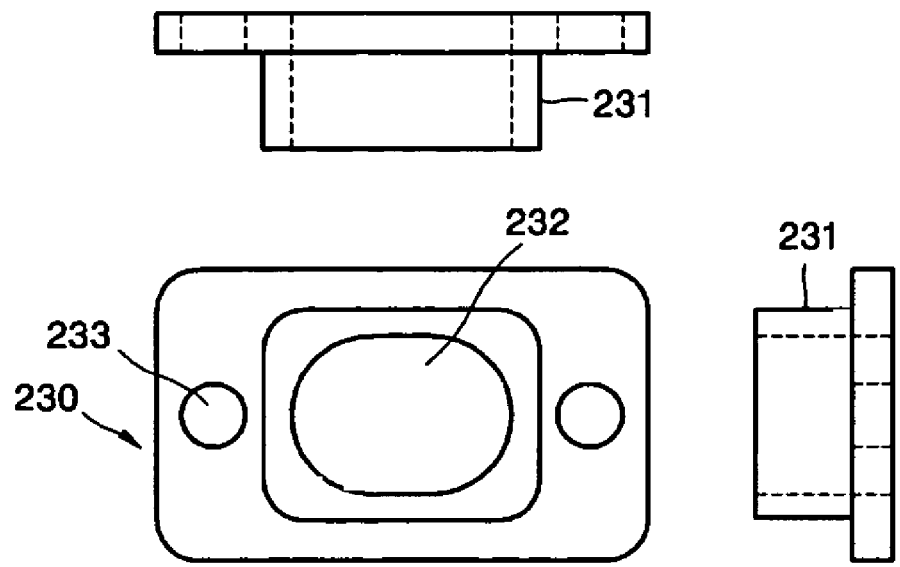
FIG. 15 illustrates a mirror position guiding member of a mirror positioning structure according to an embodiment of the present invention.

Meanwhile, if it is difficult to precisely mold the guiding plane for the mirror holding member 210 in the frame 240, a mirror position guiding member 230 shown in FIG. 15 may be separately manufactured and assembled with the frame 240. Referring to FIG. 15, the mirror position guiding member 230 has an opening 232 through which the rotation shaft 212 of the mirror holding member 210 is passed and guided on a plane. The opening 232 of the mirror position guiding member 230 has an elongated guiding plane so that the amount of the rectilinear motion of the mirror holding member 210 is adjusted within a predetermined range. In detail, the breadth of the opening 232 is the same as the diameter of the rotation shaft 212 and the length of the opening 232 is the same as the sum of a lengthwise moving distance of the mirror holding member 210, the diameter of the rotation shaft 212, and a tolerance involved in the tilt of the rotation shaft 212. A locking hole 233 is provided at each of opposite sides of the opening 232 to fix the mirror position guiding member 230 to the frame 240.

Figure 16:
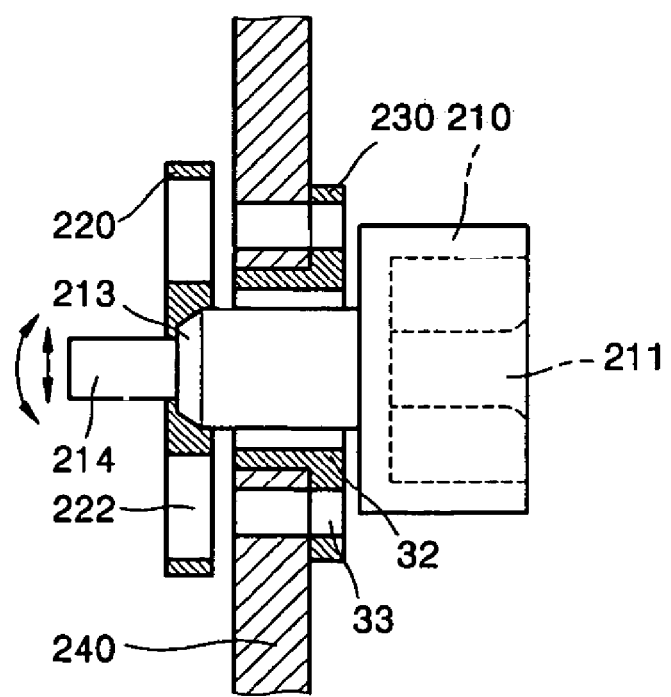
FIG. 16 illustrates an assembly of a mirror positioning structure including the mirror position guiding member.

FIG. 16 illustrates an assembly of a mirror positioning structure including the mirror position guiding member 230. The mirror position guiding member 230 is inserted through and fixed to the frame 240 between the mirror holding member 210 and the mirror position fixing member 220. The rotation shaft 212 of the mirror holding member 210 passes through the opening 232 of the mirror position guiding member 230 and extends out of the frame 240. In this situation, skew and bow are compensated for by the axial rotation and parallel move of the mirror holding member 210, and then the mirror holding member 210 is fixed at the compensated position using the mirror position fixing member 220. In other words, the assembly shown in FIG. 16 is the same as that shown in FIG. 13, with the exception that the mirror position guiding member 230 is separately provided without directly forming a guiding plane in the frame 240.

Figure 17A:
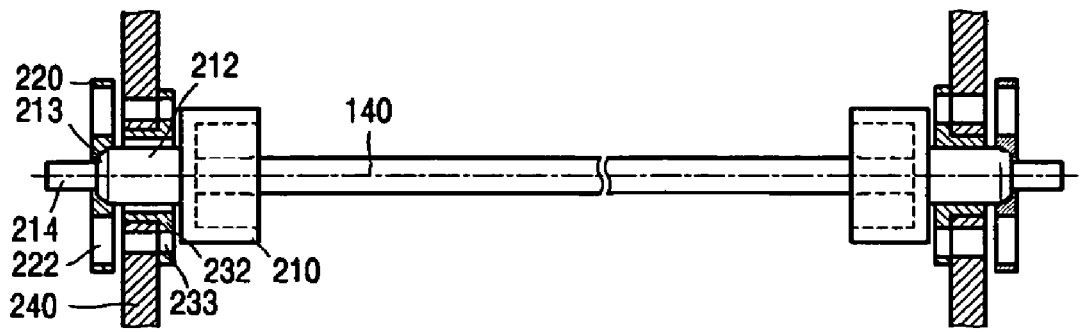
FIGS. 17A through 17C illustrate the operation of a mirror positioning structure including the mirror position guiding member.
Figure 17B:
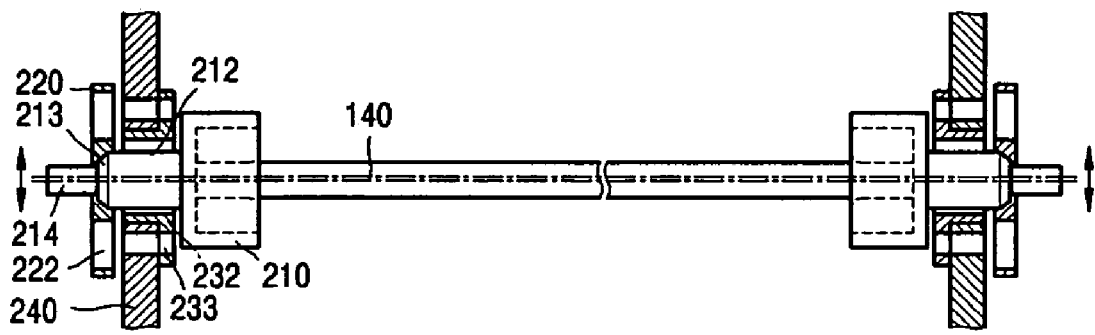
Figure 17C:
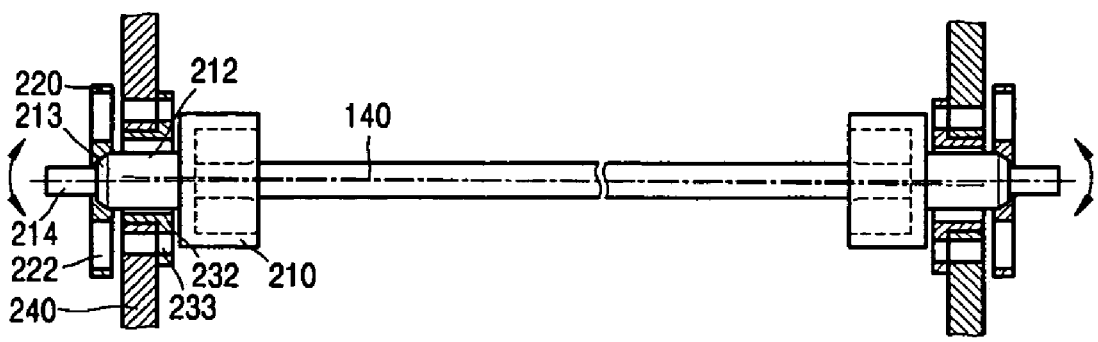

FIGS. 17A through 17C illustrate the operation of a mirror positioning structure including the mirror position guiding member 230. Although the mirror position guiding member 230 is added, the operation of the mirror positioning structure illustrated in FIGS. 17A through 17C is the same as that illustrated in FIGS. 14A through 14C. In other words, the mirror 140 may be positioned so that the central axis of the mirror 140 is perfectly aligned with the base line as shown in FIG. 17A, so that the central axis of the mirror 140 is displaced in parallel from the base line as shown in FIG. 17B, or so that the central axis of the mirror 140 is oblique to the base line as shown in FIG. 17C. When the mirror 140 is moved in parallel from the base line and fixed, the mirror position fixing members 220 at opposite sides are moved in the same direction and then fixed to the frame 240. When the mirror 140 is fixed to be oblique to the base line, the mirror position fixing members 220 at opposite sides are moved in opposite directions and then fixed to the frame 240. In any cases where the position of the mirror 140 is changed, due to the surfaces having the same curvature in the mirror holding members 210 and the mirror position fixing members 220, respectively, the mirror holding members 210 and the mirror position fixing members 220 are stably fixed to the frame 240 while compensating for skew and bow.

The operation of compensating for skew and bow using a mirror positioning structure according to any one of the above-described embodiments of the present invention in a laser scanning unit will now be described. As described above, skew and bow occur when a light beam slightly deviates due to assembly tolerances and aberrations. In the present invention, such skew and bow are compensated for by independently adjusting the rotation angle and the position of the mirror.

Figure 18A:
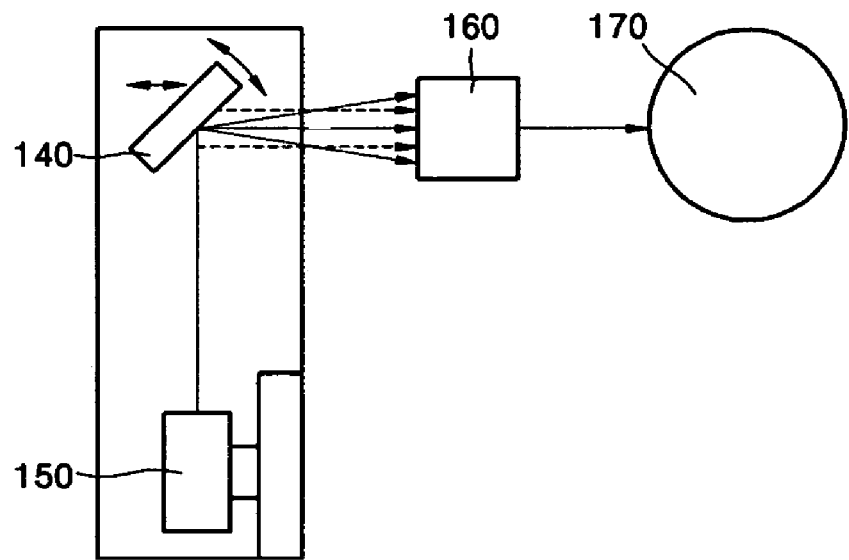
FIGS. 18A and 18B illustrate the compensation of skew and bow by adjusting the rotation and position of a mirror in a laser scanning unit according to an embodiment of the present invention.

FIG. 18A illustrates a case where a mirror positioning structure according to an embodiment of the present invention is located between a polygon mirror 150 and a scanning lens 160. In this case, the mirror 140 is located between the polygon mirror 150 and the scanning lens 160. Here, the angle at which the light beam deflected by the polygon mirror 150 is incident on the scanning lens 160 is adjusted by appropriately rotating the mirror 140. In addition, when the light beam is not exactly incident on the center portion of the scanning lens 160, the position of the mirror 140 may be changed using the mirror positioning structure so that the incident position of the light beam on the scanning lens 160 can be adjusted.

Figure 18B:
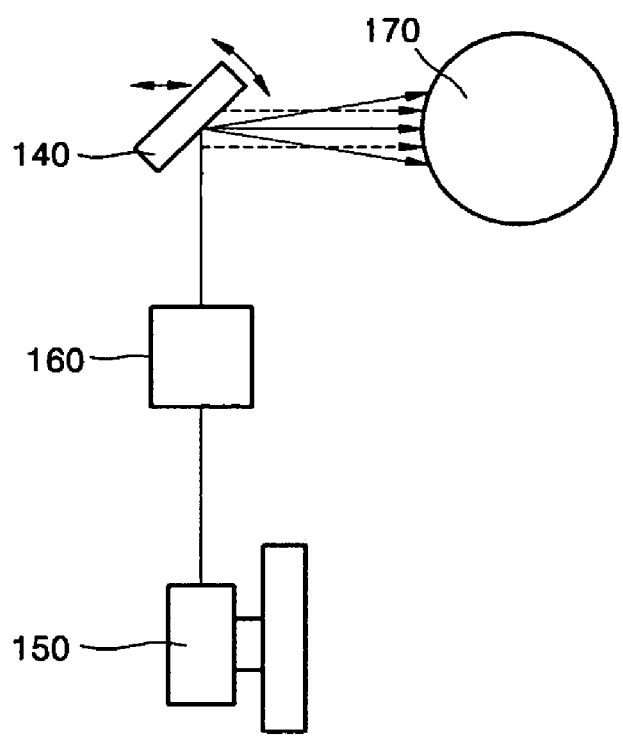

FIG. 18B illustrates a case where a mirror positioning structure according to an embodiment of the present invention is located between the scanning lens 160 and a scanned surface, such as, a photosensitive drum 170. In this case, the mirror 140 is located between the scanning lens 160 and the photosensitive drum 170. Here, the angle and the position of the mirror 140 may be appropriately adjusted using the mirror positioning structure so that a light beam focused on the photosensitive drum 170 via the scanning lens 160 is incident on the photosensitive drum 170 at an exact position and angle. As a result, skew and bow can be compensated for during scanning.

As described above, according to the present invention, the angle and the position of a mirror can be independently and easily adjusted to compensate for skew and bow. Accordingly, the present invention mechanically compensates for difficult to compensate for skew and bow that are caused by an alignment error in a laser beam, for example, in a tandem type laser scanning unit of a color laser printer.

While the invention has been shown and described with reference to certain embodiments thereof, it will be understood by those skilled in the art that various changes in form and details may be made therein without departing from the spirit and scope of the invention as defined by the appended claims.

What is claimed is:

1. A mirror positioning structure for a laser scanning unit, comprising:
    a mirror rotating member comprising a recess at one side to hold a mirror inserted therein and a rotation shaft protruding from an opposite side;
    a mirror position changing member comprising an opening through which the rotation shaft of the mirror rotating member passes such that the mirror rotating member is rotatably coupled with the mirror position changing member; and
    a fixing member comprising a receiving space in one side such that the mirror position changing member moves rectilinearly within the receiving space.

2. The mirror positioning structure of claim 1, wherein the rotation shaft has a groove at one end to allow the rotation shaft to be easily rotated.

3. The mirror positioning structure of claim 1, wherein the mirror rotating member has at least one rotation stop hole around the rotation shaft.

4. The mirror positioning structure of claim 3, wherein the mirror position changing member further comprises:
    a rotation stopper through-hole; and
    a rotation stopper passing through the rotation stopper through-hole and inserted into the rotation stop hole to couple and fix the mirror position changing member and the mirror rotating member to each other.

5. The mirror positioning structure of claim 4, wherein the rotation stopper through-hole is elongated so that the mirror rotating member is coupled with the mirror position changing member within a predetermined range of angles.

6. The mirror positioning structure of claim 4, wherein the mirror position changing member has a groove having a predetermined depth around the rotation stopper through-hole such that the rotation stopper is reliably installed.

7. The mirror positioning structure of claim 4, wherein the mirror position changing member has a rectilinear motion stop hole on a side thereof facing the fixing member, and
    a rectilinear motion adjustor is coupled to at least one side of the mirror position changing member.

8. The mirror positioning structure of claim 7, wherein each of the rotation stopper and the rectilinear motion adjustor is a screw.

9. The mirror positioning structure of claim 7, wherein the fixing member has through-holes corresponding to the opening, the rotation stopper through-hole, and the rectilinear motion stop hole in the mirror position changing member.

10. The mirror positioning structure of claim 9, wherein the through-holes in the fixing member are elongated so that the rectilinear motion of the mirror position changing member is adjusted within a predetermined range.

11. The mirror positioning structure of claim 10, wherein a rectilinear motion stopper is passed through the through-hole of the fixing member corresponding to the rectilinear motion stop hole and inserted into the rectilinear motion stop hole such that the mirror position changing member and the fixing member are coupled and fixed to each other.

12. The mirror positioning structure of claim 11, wherein the rectilinear motion stopper is a screw.

13. The mirror positioning structure of claim 11, wherein the fixing member has a groove having a predetermined depth around the through-hole corresponding to the rectilinear motion stop hole such that the rectilinear motion stopper is reliably installed.

14. The mirror positioning structure of claim 7, wherein the fixing member has a rectilinear motion adjustor mount at a position corresponding to the rectilinear motion adjustor such that the rectilinear motion adjustor coupled to the side of the mirror position changing member is stably mounted on and fixed to the rectilinear motion adjustor mount.

15. The mirror positioning structure of claim 14, wherein the fixing member has an adjustment hole at a side corresponding to the rectilinear motion adjustor such that the rectilinear motion adjustor can be rotated from outside the fixing member to rectilinearly move the mirror position changing member within the receiving space of the fixing member.

16. A laser scanning unit including a light source that emits light, a scanner for scanning the light emitted from the light source onto a scanned surface to form an image on the scanned surface, a mirror provided in the optical path between the light source and the scanned surface to compensate for skew and bow, and a mirror positioning structure for adjusting a position and angle of the mirror, wherein the mirror positioning structure comprises:
a mirror rotating member with a recess at one side to hold a mirror inserted therein and a rotation shaft protruding from an opposite side;
a mirror position changing member comprising an opening through which the rotation shaft of the mirror rotating member passes such that the mirror rotating member is rotatably coupled with the mirror position changing member; and
a fixing member with a receiving space in one side such that the mirror position changing member moves rectilinearly within the receiving space, the fixing member being attached to an outer frame of the laser scanning unit.

17. The laser scanning unit of claim 16, wherein the rotation shaft has a groove at one end to allow the rotation shaft to be easily rotated.

18. The laser scanning unit of claim 16, wherein the mirror rotating member has at least one rotation stop hole around the rotation shaft.

19. The laser scanning unit of claim 18, wherein the mirror position changing member has an elongated rotation stopper through-hole, and
a rotation stopper is passed through the rotation stopper through-hole and inserted into the rotation stop hole to couple and fix the mirror position changing member and the mirror rotating member to each other, within a predetermined range of angles.

20. The laser scanning unit of claim 19, wherein the mirror position changing member has a rectilinear motion stop hole on a side thereof facing the fixing member, and
a rectilinear motion adjustor is coupled to at least one side of the mirror position changing member.

21. The laser scanning unit of claim 20, wherein the fixing member has through-holes corresponding to the opening, the rotation stopper through-hole, and the rectilinear motion stop hole in the mirror position changing member.

22. The laser scanning unit of claim 21, wherein the through-holes in the fixing member are elongated so that the rectilinear motion of the mirror position changing member is adjusted within a predetermined range.

23. The laser scanning unit of claim 22, wherein a rectilinear motion stopper is passed through the through-hole of the fixing member corresponding to the rectilinear motion stop hole and inserted into the rectilinear motion stop hole such that the mirror position changing member and the fixing member are coupled and fixed to each other.

24. The laser scanning unit of claim 22, wherein the fixing member has a rectilinear motion adjustor mount at a position corresponding to the rectilinear motion adjustor such that the rectilinear motion adjustor coupled to the side of the mirror position changing member is stably mounted on and fixed to the rectilinear motion adjustor mount.

25. The laser scanning unit of claim 24, wherein the fixing member has an adjustment hole at a side corresponding to the rectilinear motion adjustor such that the rectilinear motion adjustor can be rotated from outside the fixing member to rectilinearly move the mirror position changing member within the receiving space of the fixing member.

* * * * *